(12) United States Patent
He et al.

(10) Patent No.: US 12,196,037 B2
(45) Date of Patent: Jan. 14, 2025

(54) DOOR GUARDRAIL

(71) Applicant: Zhongshan Ekar Uping Houseware Co., Ltd., Zhongshan (CN)

(72) Inventors: Jianghua He, Zhongshan (CN); Guozhu Feng, Zhongshan (CN); Xinliang Ouyang, Zhongshan (CN)

(73) Assignee: Zhongshan Ekar Uping Houseware Co., Ltd., Zhongshan (CN)

( * ) Notice: Subject to any disclaimer, the term of this patent is extended or adjusted under 35 U.S.C. 154(b) by 673 days.

(21) Appl. No.: 17/360,054

(22) Filed: Jun. 28, 2021

(65) Prior Publication Data

US 2022/0316267 A1 Oct. 6, 2022

(30) Foreign Application Priority Data

Apr. 2, 2021 (CN) .......................... 202120685487.7

(51) Int. Cl.
| | |
|---|---|
| *E06B 7/32* | (2006.01) |
| *A01K 1/00* | (2006.01) |
| *E05C 1/00* | (2006.01) |
| *E05C 1/06* | (2006.01) |
| *E06B 9/01* | (2006.01) |
| *E06B 9/00* | (2006.01) |

(52) U.S. Cl.
CPC .............. *E06B 7/32* (2013.01); *A01K 1/0017* (2013.01); *E05C 1/004* (2013.01); *E05C 1/06* (2013.01); *E06B 9/01* (2013.01); *E06B 2009/002* (2013.01)

(58) Field of Classification Search
CPC ........ E06B 7/32; E06B 9/01; E06B 2009/002; E05C 1/004; E05C 1/06
USPC .................................................... 49/449, 451
See application file for complete search history.

(56) References Cited

U.S. PATENT DOCUMENTS

| | | | | |
|---|---|---|---|---|
| 1,459,522 | A * | 6/1923 | Woods ...................... | E06B 9/01 160/223 |
| 2,972,825 | A * | 2/1961 | Stillwell ................. | E06B 11/02 49/55 |
| 6,405,497 | B1 * | 6/2002 | Christopolous ........... | E06B 9/01 49/54 |
| 7,412,800 | B2 * | 8/2008 | Maier .................... | E06B 3/5063 49/176 |
| 2017/0037678 | A1 * | 2/2017 | Weisbeck ............ | E05B 65/0007 |
| 2022/0010615 | A1 * | 1/2022 | Chen ........................ | E06B 9/04 |

* cited by examiner

*Primary Examiner* — Gregory J Strimbu
(74) *Attorney, Agent, or Firm* — Leason Ellis LLP (57) ABSTRACT

A door guardrail includes a door guardrail body having an opening; a movable baffle movably mounted on and movable relative to the door guardrail body to open or close the opening; and a locking device, arranged on the movable baffle or the door guardrail body; and wherein the locking device is capable of limiting or releasing the movement of the movable baffle relative to the door guardrail body.

8 Claims, 8 Drawing Sheets

DOOR GUARDRAIL

CROSS-REFERENCE TO RELATED APPLICATION

This application claims priority to Chinese patent application No. 202120685487.7, filed Apr. 2, 2021, the content of the Chinese patent application is incorporated herein by reference in its entirety.

TECHNICAL FIELD

The present disclosure relates to the field of doorsets, and particularly to a door guardrail.

BACKGROUND

It is well known that, to prevent young children and pets from running out of a limited area, many families now may mount a door guardrail in a narrow place such as a passage of a hall or a doorway of a room to limit the young children and the pets in the limited area.

A door guardrail of existing technologies is capable of obstructing the young children and the pets. When the door guardrail is closed, both the young children and the pets cannot enter or leave the limited area, but in some case, while a user may want to let only a pet enter or leave the limited area, he/she has to open the door guardrail, the operation of such a guardrail is inconvenience.

SUMMARY

The present disclosure aims at solving at least one of the technical problems in the prior art. To this end, the present disclosure provides a door guardrail, which, in a case that the door guardrail is closed, can still allow pets to enter and leave a limited area without opening or closing the door guardrail repeatedly.

The door guardrail according to some embodiments of the present disclosure includes: a door guardrail body, having an opening; a movable baffle, movably mounted on and movable relative to the door guardrail body to open or close the opening; and a locking device, arranged on the movable baffle or the door guardrail body; and wherein the locking device is capable of limiting or releasing the movement of the movable baffle relative to the door guardrail body.

In some embodiment of the present disclosure, the movable baffle is moveable along a width direction of the door guardrail body to open or close the opening.

In some embodiment of the present disclosure, the movable baffle is moveable along a height direction of the door guardrail body to open or close the opening.

In some embodiment of the present disclosure, the opening is arranged in a middle lower portion of the door guardrail body, the door guardrail body comprises at least one guide rod arranged along a vertical direction above the opening, and the movable baffle is movably mounted on and moveable vertically along the guide rod.

In some embodiment of the present disclosure, the locking device includes a mounting base, arranged on the movable baffle, and having a mounting cavity formed therein and at least one sliding groove formed on a side wall thereof, wherein one end of the sliding groove faces towards the guide rod; a sliding block, movably mounted in the sliding groove, and having one end extending into the mounting cavity; and a rotating block, rotatably mounted in the mounting cavity, and having at least one convex block protruding outwardly from a side wall of the rotating block; wherein, when the rotating block rotates relative to the mounting base, the convex block is capable of abutting against the sliding block and pushing the sliding block to approach the guide rod along the sliding groove.

In some embodiment of the present disclosure, two sliding grooves are arranged on two opposite sides of the mounting cavity respectively, and one sliding block is movably arranged at each of the sliding grooves; two convex blocks are oppositely arranged on the side wall of the rotating block; and two guide rods are arranged laterally to the two sliding grooves, respectively.

In some embodiment of the present disclosure, the movable baffle is hollow and consisted of a first baffle and a second baffle, the locking device is arranged inside the movable baffle, and the first baffle and/or the second baffle has a notch on a surface thereof at a position corresponding to the locking device; and the movable baffle further comprise a communication opening matched with the guide rod and arranged in a junction surface of the first baffle and the second baffle, and the guide rod is movably inserted into the communication opening.

In some embodiment of the present disclosure, the locking device further includes at least one knob having an insertion portion on one side surface thereof, wherein the insertion portion is attached to the rotating block through the notch, and the knob is capable of moving the rotating block.

In some embodiment of the present disclosure, each of the first baffle and the second baffle has one notch on a surface thereof; and two knobs are mounted at two notches respectively, and both the two knobs are connected with the rotating block.

In some embodiment of the present disclosure, the door guardrail further includes a connecting device arranged between the two knobs for detachably connecting the two knobs.

The door guardrail provided by some embodiments of the present disclosure has the beneficial effects that: according to the embodiments of the present disclosure, the door guardrail body is provided with an opening, and a movable baffle is movably mounted on the opening; the movable baffle can be moved to expose the opening to allow a pet to go through, without requiring a user to repeatedly open or close the door guardrail, a more convenient operation is achieved.

BRIEF DESCRIPTION OF THE DRAWINGS

The present disclosure is further described in details hereafter with reference to the drawings and embodiments.

DETAILED DESCRIPTION

The embodiments of the present disclosure will be described in more detail, some embodiments of the present disclosure are shown in the drawings. The drawings are intended to supplement the description with figures, allowing people to understand in an easier way the technical features and the technical schemes of the present disclosure, but shall not be deemed as limitations to the present disclosure.

In the description of the present disclosure, it should be understood that, the directions or the positional relationships related to the orientation description, for example, the directions or the positional relationships indicated by "upper", "lower", "front", "rear", "left", "right", etc., are based on the directions or the positional relationships shown in the accompanying drawings. The directions or the positional relationships are merely intended to facilitate the description of the present disclosure and simplify the description, and are not intended to indicate or imply that the device or element referred to must have a specific orientation, be constructed and operated in a specific orientation, and therefore shall not be understood as a limitation to the present disclosure.

In the description of the present disclosure, the meaning of "several" refers to be one or more, and the meaning of "multiple" refers to be more than three. The meanings of "greater than", "less than", "more than", etc., are understood as not including the number, while the meanings of "above", "below", "within", etc., are understood as including the number. If there is a description to "first" and "second", it is only for the purpose of distinguishing technical features, and shall not be understood as indicating or implying relative importance, implicitly indicating the number of the indicated technical features or implicitly indicating the order of the indicated technical features.

In the description of the present disclosure, unless otherwise clearly defined, words such as "setting", "installation", "connection", etc., shall be understood broadly, and those having ordinary skills in the art can reasonably determine the specific meanings of the above words in the present disclosure in combination with the specific contents of the technical schemes.

Referring to FIGS. 1 to 8, a door guardrail according to an embodiment of the present disclosure includes a door guardrail body 100 which is generally in a rectangle shape. It is conceivable that the door guardrail body 100 may also be designed in a round shape, an oval shape or other shapes, but not limited to the rectangle shape. The door guardrail body 100 is provided with an opening 110 of which size may be determined according to actual needs. A movable baffle 200 is movably mounted on the door guardrail body 100. The movable baffle 200 is capable of moving relative to the door guardrail body 100, for opening or closing the opening 110. The movable baffle 200 or the door guardrail body 100 is provided with a locking device, the locking device is capable of limiting the movement of the movable baffle 200 relative to the door guardrail body 100, or the locking device is capable of releasing the movement of the movable baffle 200 relative to the door guardrail body 100. In other words, the locking device has at least a locked state and an unlocked state. When the locking device is switched into the locked state, the locking device can lock the movable baffle 200 in a position relative to the door guardrail body 100. In this case, the movable baffle 200 cannot be moved relative to the door guardrail body 100. When the locking device is switched into the unlocked state, the locking device releases the movable baffle 200 from the door guardrail body 100. In this case, the movable baffle 200 can be moved relative to the door guardrail body 100.

By providing the opening 110 on the door guardrail body 100, and movably mounting the movable baffle 200 on the door guardrail body 100, when a user allows a pet to enter and leave a limited area blocked by the guardrail, the user can move the movable baffle 200 expose the opening 110. In this way, the pet can enter and enter the limited area through the opening 110 without requiring the user to repeatedly open or close the door guardrail, a more convenient operation is achieved.

Figure 1:
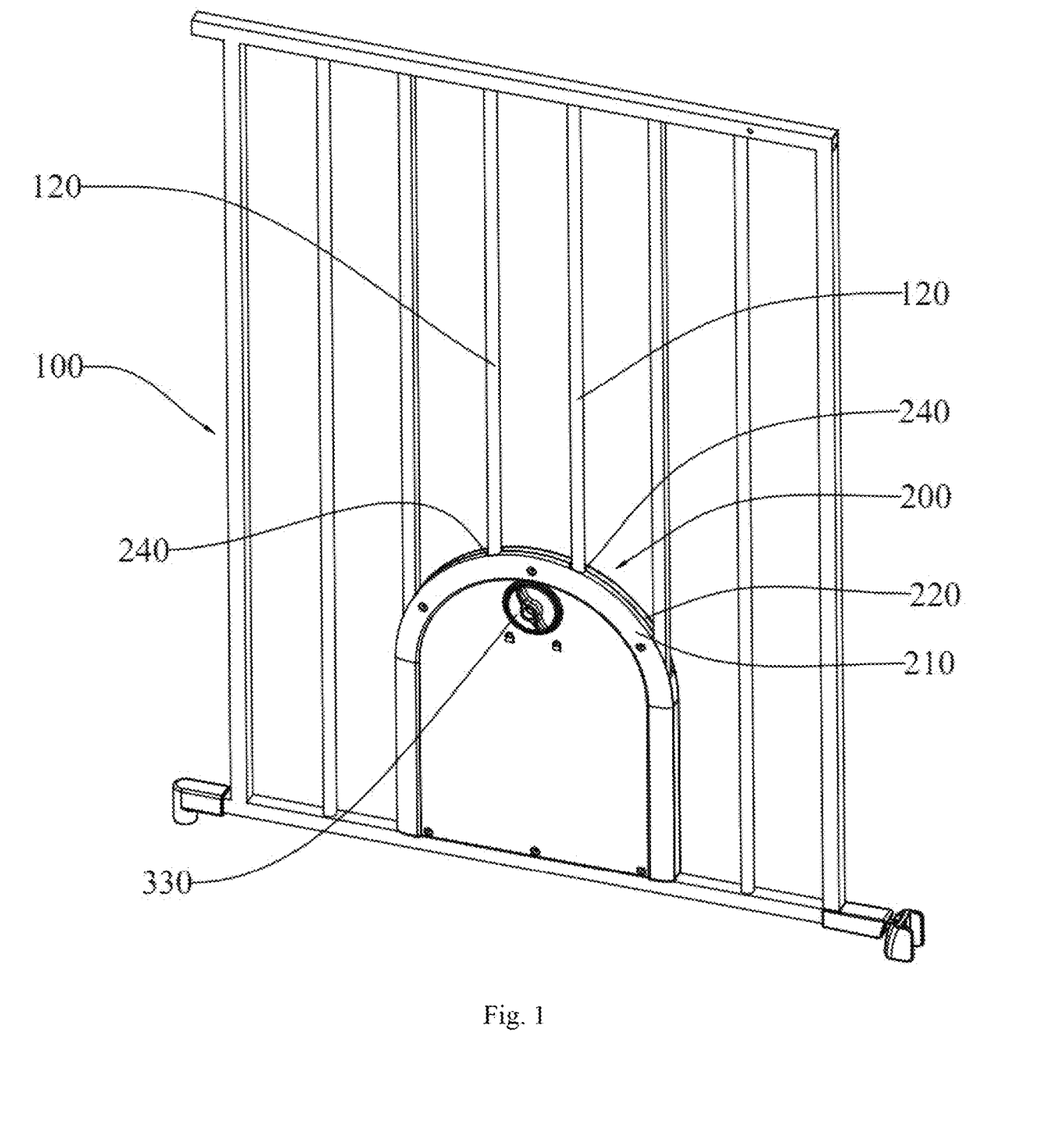
FIG. 1 is a schematic view of a door guardrail according to an embodiment of the present disclosure.
Figure 2:
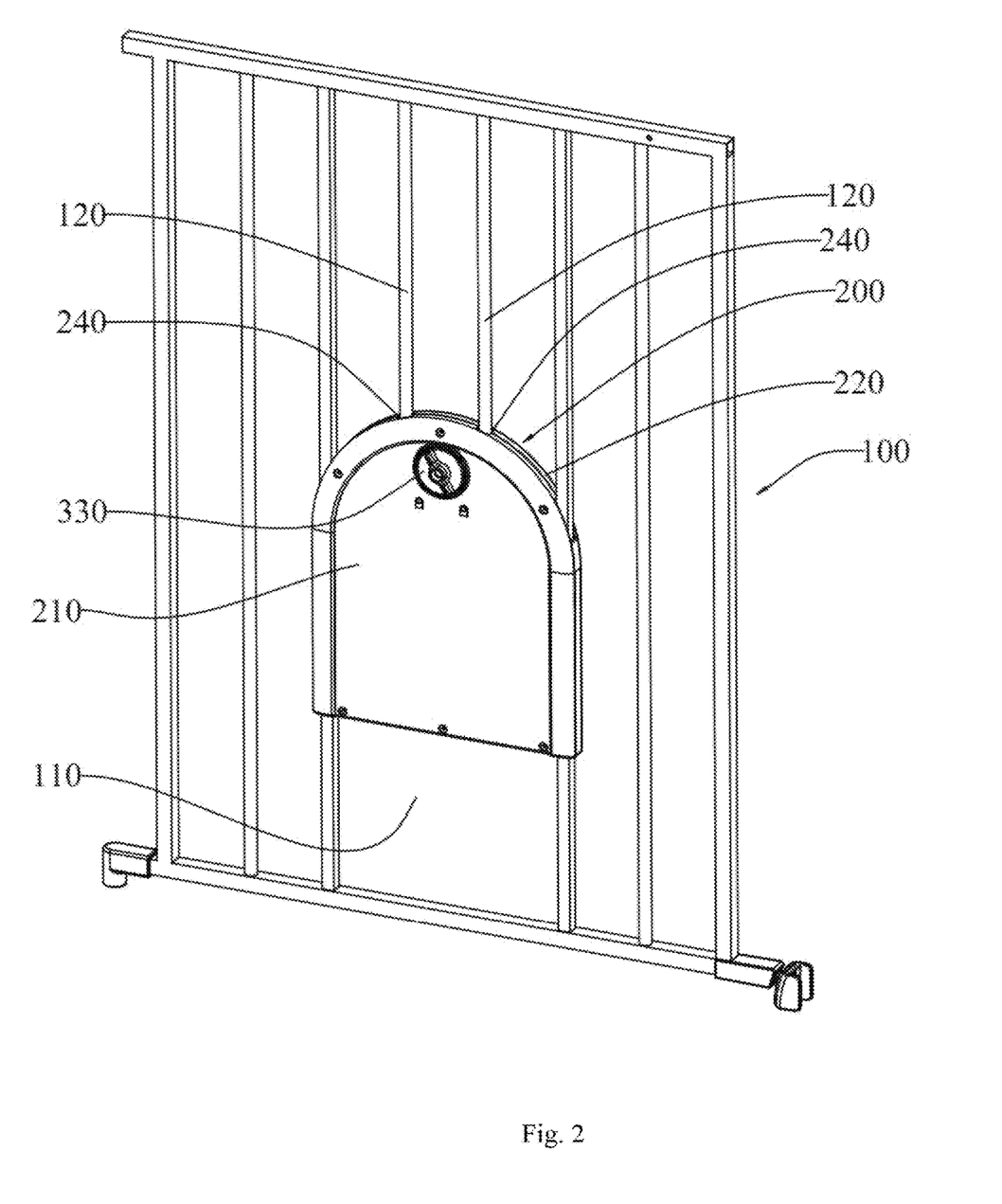
FIG. 2 is a schematic view of a movable baffle in the door guardrail shown in FIG. 1 with the movable baffle in a position to open an opening.
Figure 3:
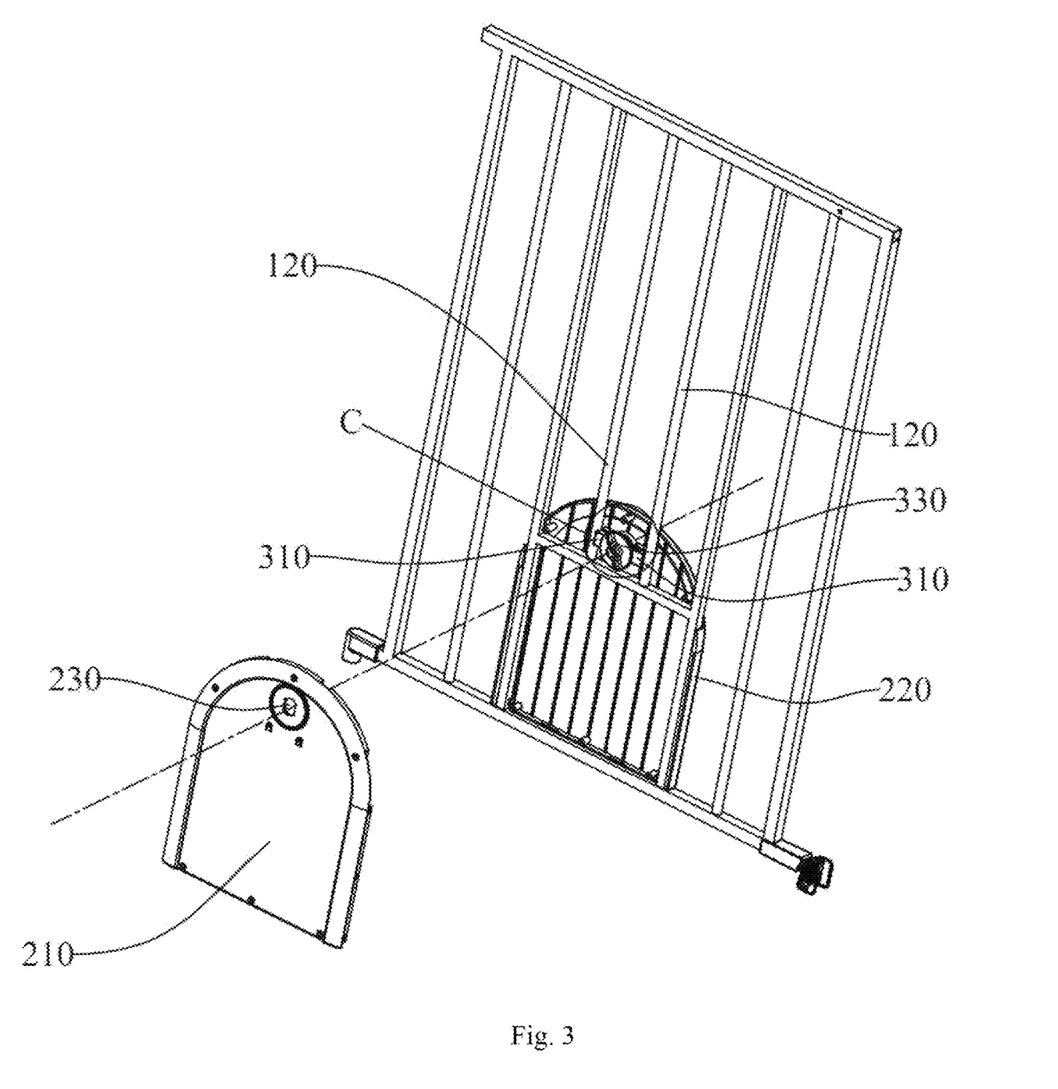
FIG. 3 is an exploded view of a partial structure of the door guardrail shown in FIG. 1.

Referring to FIGS. 1 to 3, to allow the movable baffle 200 to open or close the opening 110 in a better way, in some embodiments of the present disclosure, the movable baffle 200 is capable of being moveable along a height direction of the door guardrail body 100 to open or close the opening 110.

It is conceivable that the movable baffle 200 is also capable of being moveable along a width direction of the door guardrail body 100 to open or close the opening 110. Specific arrangements may be determined according to actual needs.

Further, to facilitate the pet to pass through the opening 110, and facilitate the production and assembly of the guardrail door as well, in some embodiments of the present disclosure, the opening 110 is arranged in a middle lower portion of the door guardrail body 100, thus facilitating the pet to pass through the opening 110. At least one guide rod 120 located above the opening 110 is arranged on the door guardrail body 100, and the guide rod 120 is arranged along a vertical direction. The movable baffle 200 is movably mounted on the guide rod 120, and the movable baffle 200 is capable of be moveable vertically along the guide rod 120. In this way, the guardrail door can be made simpler and more convenient.

Referring to FIGS. 4 to 8, to further simplify the structure of the guardrail door, in some embodiments of the present disclosure, the locking device includes a mounting base 300, a sliding block 310 and a rotating block 320. The mounting base 300 is arranged on the movable baffle 200, and has a mounting cavity 301 formed inside the mounting base 300, the mounting base 300 is provided with at least one sliding groove 302 on a side wall of the mounting cavity 301, and one end of the sliding groove 302 faces towards the guide rod 120. In this embodiment, the sliding groove 302 is a through groove with both ends open. The sliding block 310 is movably mounted in the sliding groove 302, and one end of the sliding block 310 extends into the mounting cavity 301. The rotating block 320 is rotatably mounted in a middle portion of the mounting cavity 301, and the rotating block 320 is provided with at least one convex block 321 protruding outwardly form a side wall of the rotating block 320. When the rotating block 320 is rotated relative to the mounting base 300, the convex block 321 is capable of abutting against the sliding block 310 and pushing the sliding block 310 to approach the guide rod 120 along the sliding groove 302. By adopting the structure above, when it is necessary to lock the movable baffle 200 in a position relative to the door guardrail body 100, the user may twist the rotating block 320 to rotate. In this case, the convex block 321 on the rotating block 320 abuts against the sliding block 310 and pushes the sliding block 310 to move towards the guide rod 120 along the sliding groove 302, such that the sliding block 310 can press against the guide rod 120. Therefore, the position of the movable baffle 200 relative to the door guardrail body 100 is locked. When it is necessary to unlock the locked position of the movable baffle 200 relative to the door guardrail body 100, the user only needs to reverse twist the rotating block 320, which is simple and convenient.

To ensure that the locking device is capable of locking the position of the movable baffle 200 relative to the door guardrail body 100, in some embodiments of the present disclosure, two sliding grooves 302 are provided. The two sliding grooves 302 are correspondingly arranged on two opposite sides of the mounting cavity 301, and each sliding groove 302 is movably provided with one sliding block 310. The rotating block 320 is provided with two convex blocks 321 respectively arranged on two opposite side walls of the rotating block 320. Two guide rods 120 are provided, and arranged laterally to the two sliding grooves 302 in one-to-one correspondence. By adopting the structure above, when the user turns the rotating block 320 to rotate, the rotating block 320 can simultaneously drive two sliding blocks 310 to move outwards along sliding grooves 302 respectively to squeeze the guide rods 120, thereby greatly improving the locking force of the locking device to lock the position of the movable baffle 200 relative to the door guardrail body 100, and ensuring that the position of the movable baffle 200 relative to the door guardrail body 100 is unchanged while the locking device is actuated.

Figure 4:
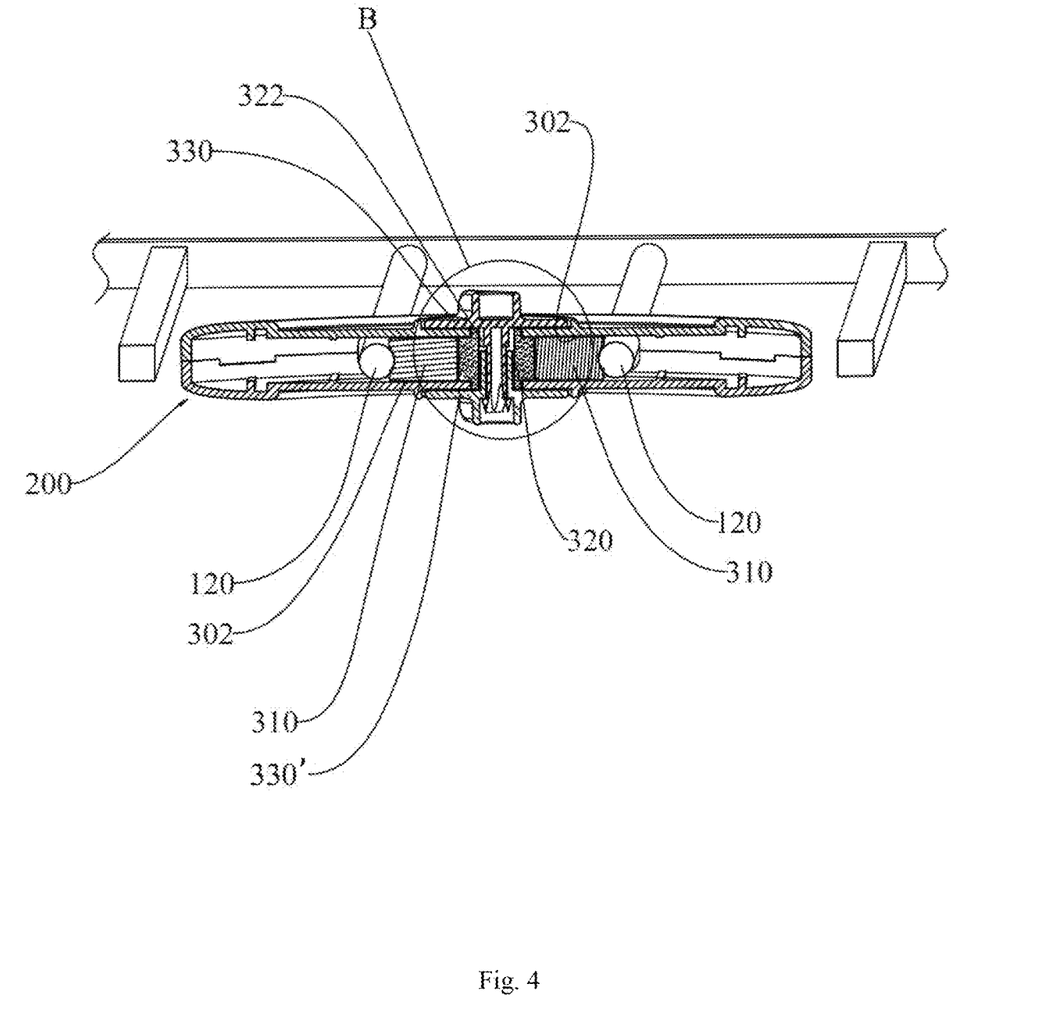
FIG. 4 is a sectional view of the door guardrail shown in FIG. 1.
Figure 5:
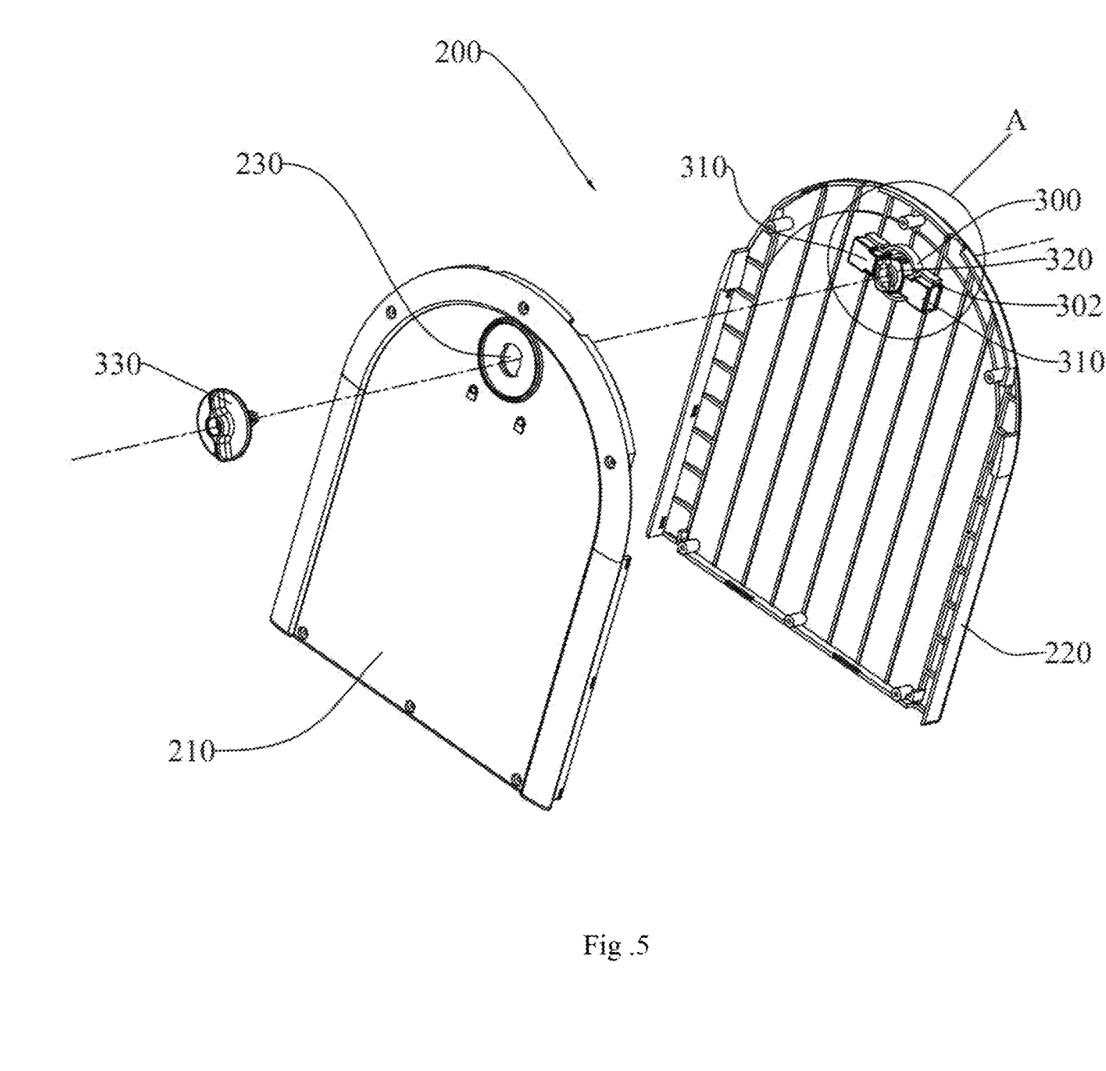
FIG. 5 is an exploded partial view of the movable baffle in the door guardrail shown in FIG. 1.
Figure 6:
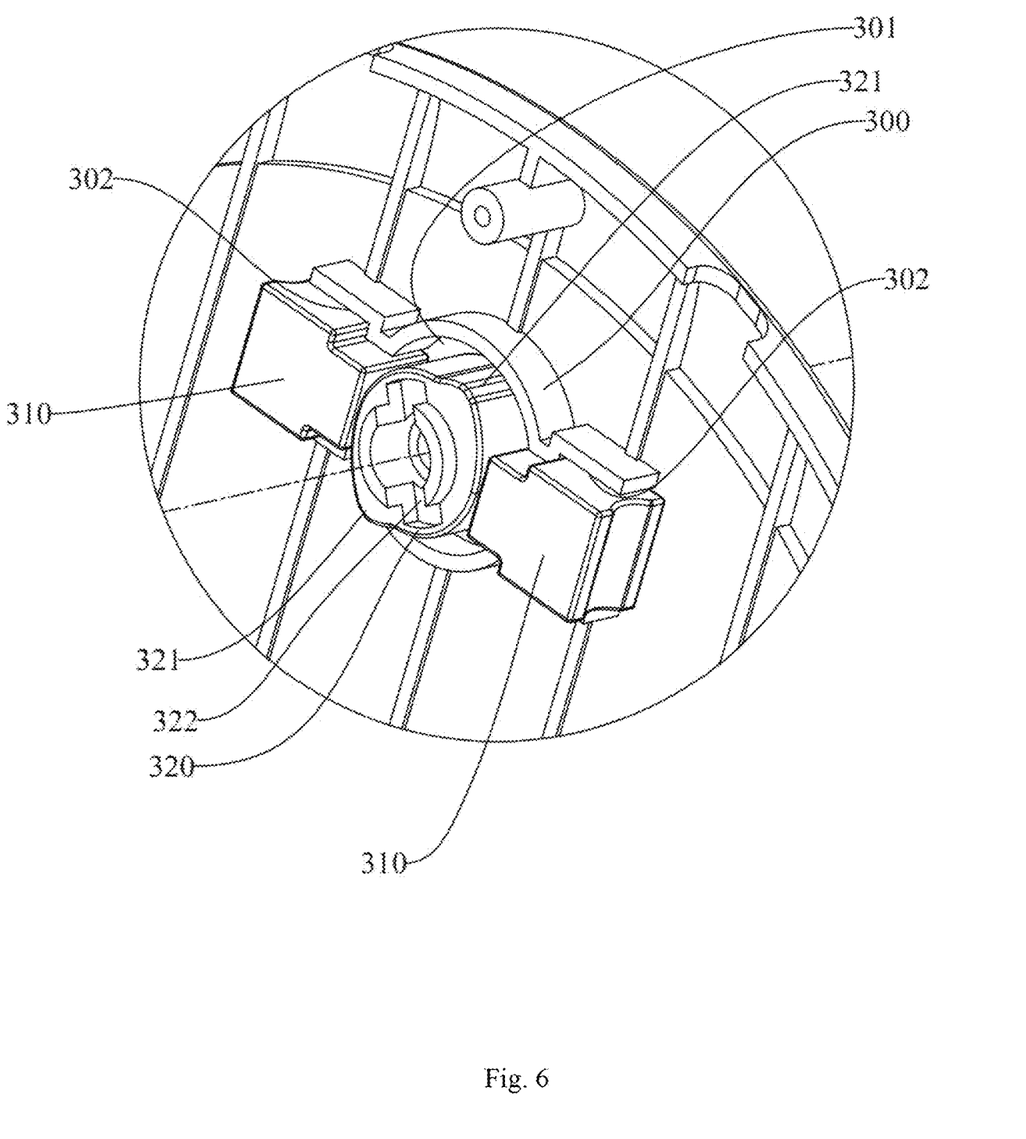
FIG. 6 is an enlarged view of portion A in FIG. 5.
Figure 7:
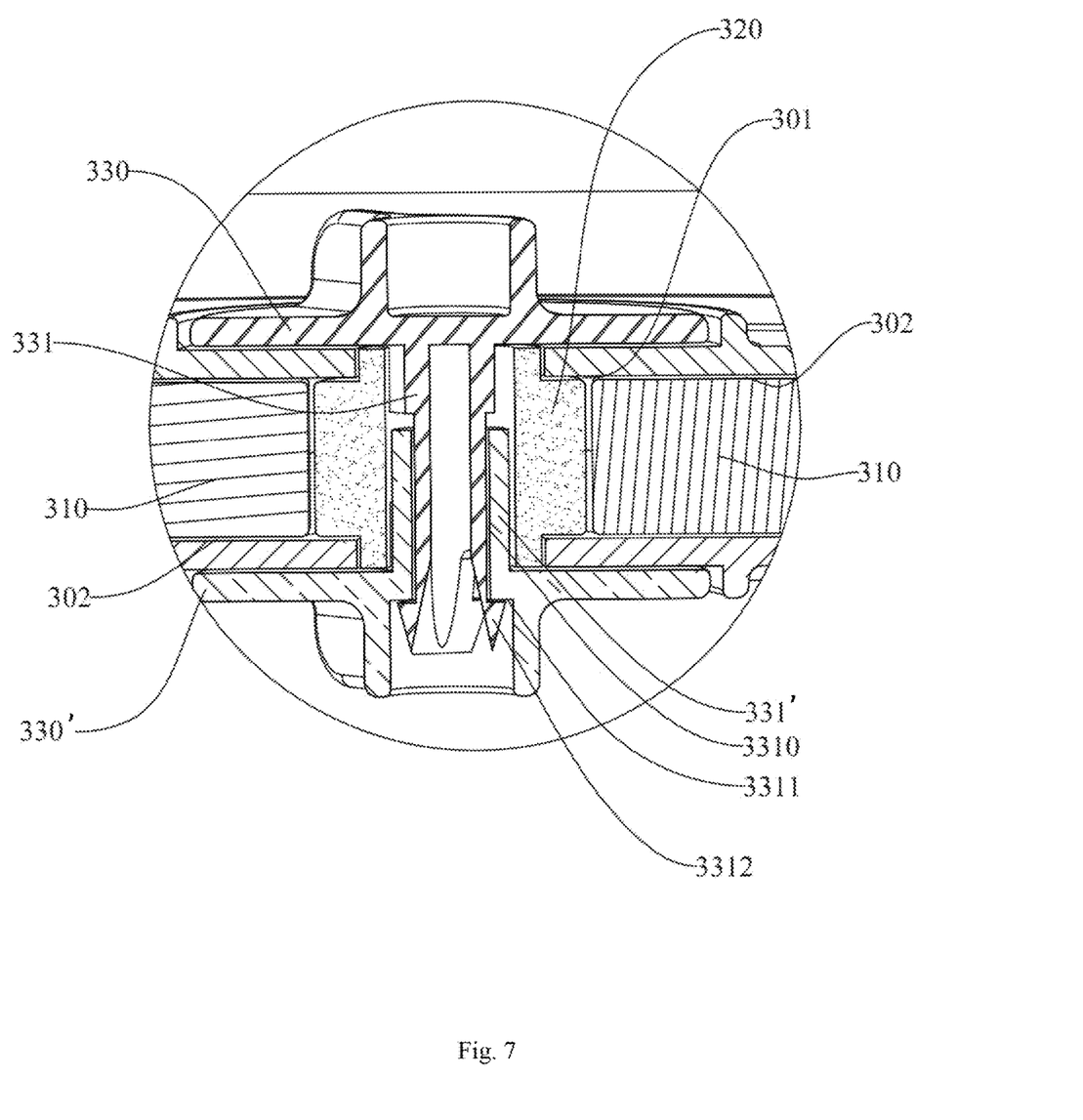
FIG. 7 is an enlarged view of portion B in FIG. 4.
Figure 8:
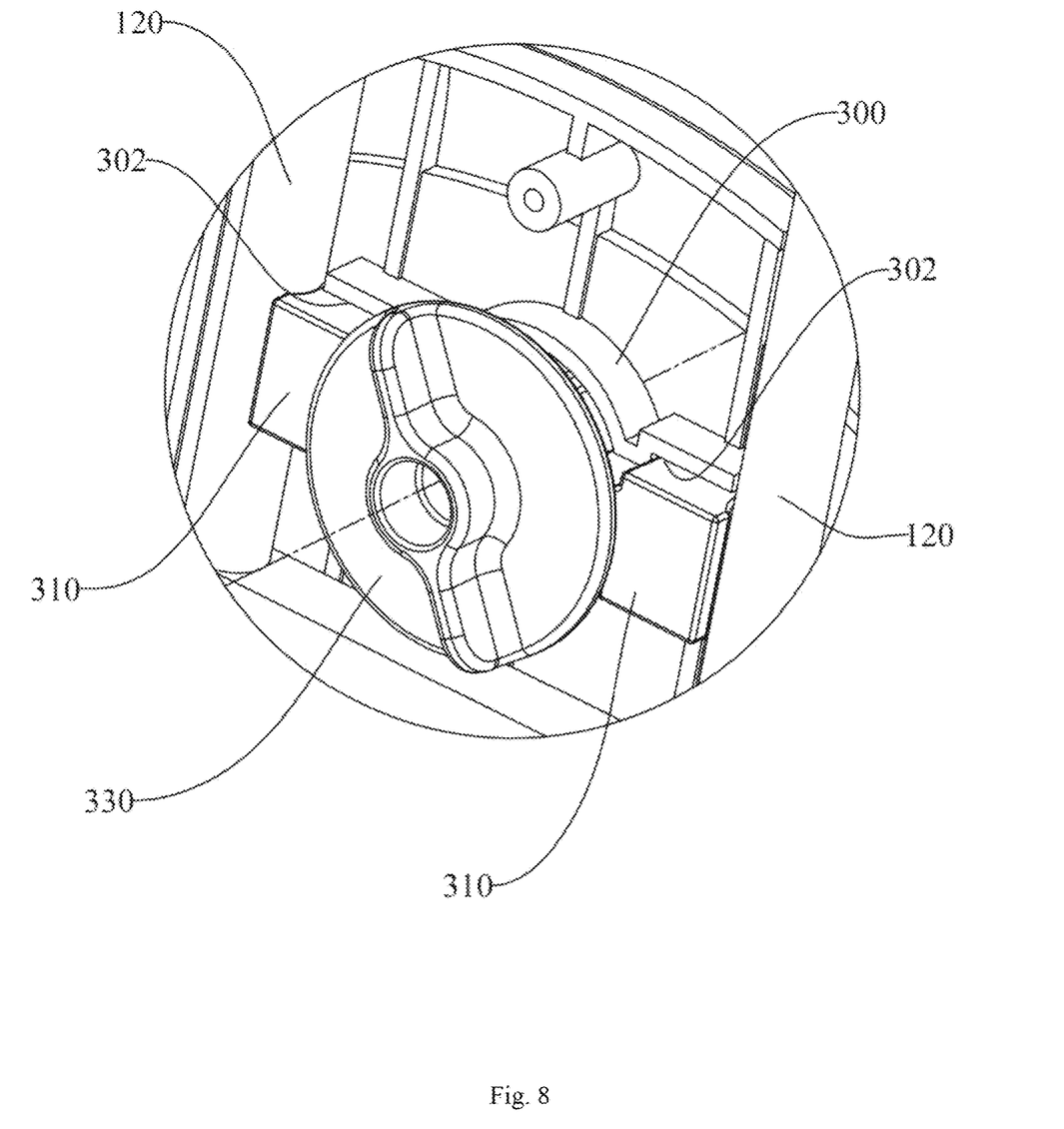
FIG. 8 is an enlarged view of portion C in FIG. 3.

Referring to FIGS. 4, 5 and 7, to facilitate the production and assembly of the movable baffle 200, in some embodiments of the present disclosure, the movable baffle 200 is hollow, and formed by a first baffle 210 and a second baffle 220 spliced together. The locking device is arranged inside the movable baffle 200. In an embodiment, each of the first baffle 210 and the second baffle 220 is provided with a notch 230 on a surface thereof at a position corresponding to the locking device. In another embodiment, the first baffle 210 or the second baffle 220 is provided with a notch 230 on a surface thereof at a position corresponding to the locking device. The user can drive the rotating block 320 of the locking device to rotate through the notch 230, which is simple and convenient. A communication opening 240 matched with the guide rod 120 is arranged on a joint face of the first baffle 210 and the second baffle 220, and the guide rod 120 is movably inserted into the communication opening 240. The structure above provides convenience in the production and assembly of the movable baffle 200, and reduces the production cost.

Further, to enable the user to drive the rotating block 320 to rotate in a better way, in an embodiment of the present disclosure, the locking device further includes at least one knob 330, 330', the knob 330, 330' is provided with a insertion portion 331, 331' on a side surface thereof, the insertion portion 331, 331' is attached to the rotating block 320 through the notch 230. The knob 330, 330' is capable of driving the rotating block 320. In this embodiment, the rotating block 320 is provided with a clamping groove 322 on a surface thereof, and a clamping block (not shown in the figures) matched with the clamping groove 322 is arranged on the insertion portion 331, 331', such that the knob 330, 330' can drive the rotating block 320 to rotate through the clamping block clamped in the clamping groove 322. It is conceivable that the insertion portion 331, 331' may also be connected with the rotating block 320 by means of thread connection, and the specific arrangements may be determined according to actual needs.

Further, each of the first baffle 210 and the second baffle 220 is provided with one notch 230, accordingly two knobs 330, 330' are provided. The two knobs 330, 330' are mounted at the two notches 230 respectively, and the two knobs 330, 330' are both connected with the rotating block 320. By adopting the structure above, the user may control any one of the knob 330, 330' to rotate, that is, may drive the rotating block 320 to rotate and realize the control of the locking device to lock or unlock the position of the movable baffle 200 relative to the door guardrail body 100, which is simpler to operate.

Referring to FIGS. 4 and 7, to connect the two knobs 330, 330' with each other in a better way, a connecting device for detachably connecting the two knobs 330, 330' is arranged between the two knobs. In this embodiment, the two knobs include a first knob 330 and a second knob 330', the insertion portion 331' of the second knob 330' has an insertion channel 3310 extending through the second knob 330' inside the insertion portion 331', and the insertion channel 3312 is provided with an annular clamping groove 3311 on an inner wall thereof. The insertion portion 331 of the first knob 330 at an end portion thereof is provided with an elastic claw 3312 which can be opened or closed, and the rotating block 320 is hollow. When assembling, the second knob 330' with the insertion channel 3310 is inserted into the rotating block 320 first, and then the first knob 330 with the elastic claw 3312 is mounted in the rotating block 320. In this way, the insertion portion 331 of the first knob 330 with the elastic claw 3312 is inserted into the insertion channel 3310, and the elastic claw 3312 is engaged with the annular clamping groove 3311, such that the two knobs 330, 330' can be detachably connected. When disassembly, it is only needed to squeeze the elastic claw 3312 to contract and release the engagement between the elastic claw 3312 and the annular clamping groove 3311, which is simple and convenient. It is conceivable that, the two knobs 330, 330' may also be connected by means of a thread connection. Specifically, one knob 330, 330' is provided with a threaded hole (not shown in the figure), and the other knob 330, 330' is provided with a connecting screw (not shown in the figure). The two knobs are detachably connected through the connecting screw and the threaded hole.

It is conceivable that, the locking device may adopt other structures besides the above-mentioned structure. For example, the locking device may include a thread connecting seat (not shown in the figure) arranged on an inner wall of the second baffle 220 and a locking bolt (not shown in the figure) matched with the thread connecting seat. The first baffle 210 has an opening on a surface thereof at a position corresponding to the thread connecting seat. In assembling, the locking bolt is in thread connection with the thread connecting seat through the opening. In use, the user can rotate the locking bolt to drive the first baffle 210 and the second baffle 220 to approach each other and clamp the guide rod 210, thus locking the position of the movable baffle 200 relative to the door guardrail body 100. In unlocking, only the locking bolt needs to be rotated reversely, to cause the first baffle 210 and the second baffle 220 no longer to clamp the guide rod 210. In this way, the movable baffle 200 can be moved.

The embodiments of the present disclosure are described in detail with reference to the drawings above, but the present disclosure is not limited to the above embodiments, and various modifications may be made within the knowledge scope of those of ordinary skills in the art without departing from the purpose of the present disclosure.

What is claimed is:
1. A door guardrail, comprising:
   a door guardrail body, having an opening; the opening is arranged in a middle lower portion of the door guardrail body, the door guardrail body comprises at least one guide rod arranged along a vertical direction above the opening;
a movable baffle, movably mounted on and moveable vertically along the guide rod; and the movable baffle is moveable along a height direction of the door guardrail body to open or close the opening;
a locking device, arranged on the movable baffle;
the locking device comprises:
    a mounting base, arranged on the movable baffle, and having a mounting cavity formed therein and at least one sliding groove formed on a side thereof,
wherein one end of the sliding groove faces towards the guide rod;
    a sliding block, movably mounted in the sliding groove, and having one end extending into the mounting cavity;
    a rotating block, rotatably mounted in the mounting cavity, and having at least one convex block protruding outwardly from a side wall of the rotating block;
wherein, when the rotating block rotates relative to the mounting base, the convex block is capable of abutting against the sliding block and pushing the sliding block toward the guide rod along the sliding groove;
wherein the locking device is capable of limiting or allowing movement of the movable baffle relative to the door guardrail body;
wherein the movable baffle is hollow and the movable baffle includes a first baffle and a second baffle, the locking device is arranged inside the movable baffle, and the first baffle or the second baffle has a notch on a surface thereof at a position corresponding to a position of the locking device; and
the movable baffle further comprises a communication opening defined by the first baffle and the second baffle, and the guide rod is movably inserted into the communication opening.

2. The door guardrail of claim 1, wherein,
the locking device further comprises a second sliding groove positioned opposite said sliding groove, and a second sliding block movably mounted in the second sliding groove;
the rotating block further includes a second convex block positioned on the rotating block opposite said convex block; and
the door guiderail body further includes a second guide rod.

3. The door guardrail of claim 2, wherein,
the locking device further comprises at least one knob having an insertion portion on one side surface thereof, wherein the insertion portion is attached to the rotating block through the notch, and the knob is capable of moving the rotating block.

4. The door guardrail of claim 3, wherein,
the other of the first baffle or the second baffle has a second notch on a surface thereof; and
a second knob is mounted in the second notch.

5. The door guardrail of claim 4, further comprising a connecting device arranged between the two knobs for detachably connecting the two knobs.

6. The door guardrail of claim 1, wherein,
the locking device further comprises at least one knob having an insertion portion on one side surface thereof, wherein the insertion portion is attached to the rotating block through the notch, and the knob is capable of moving the rotating block.

7. The door guardrail of claim 6, wherein,
the other of the first baffle or the second baffle has a second notch on a surface thereof; and
a second knob is mounted in the second notch.

8. The door guardrail of claim 7, further comprising a connecting device arranged between the two knobs for detachably connecting the two knobs.

* * * * *